United States Patent [19]

Sakakibara et al.

[11] 4,250,924
[45] Feb. 17, 1981

[54] ELECTROMAGNETIC CONTROL VALVE ASSEMBLY

[75] Inventors: Naoji Sakakibara, Chiryu; Nobuyuki Hashimoto; Tsukasa Watanabe, both of Toyota, all of Japan

[73] Assignee: Aisin Seiki Kabushiki Kaisha, Kariya City, Japan

[21] Appl. No.: 3,822

[22] Filed: Jan. 16, 1979

[30] Foreign Application Priority Data

Jan. 17, 1978 [JP] Japan .................................. 53-3510

[51] Int. Cl.³ ..................... F15B 13/044; F16K 11/16
[52] U.S. Cl. ............................... 137/868; 137/596.17; 137/870; 251/138
[58] Field of Search .................. 137/596.17, 868, 870; 251/78, 138

[56] References Cited

U.S. PATENT DOCUMENTS

| | | | |
|---|---|---|---|
| 2,529,533 | 11/1950 | Almond et al. | 251/138 |
| 2,562,631 | 7/1951 | Morrison | 251/138 X |
| 3,176,516 | 4/1965 | Guenther | 251/138 X |
| 3,991,788 | 11/1976 | Kull | 137/870 X |
| 4,076,046 | 2/1978 | Hieronymus et al. | 251/138 X |
| 4,170,339 | 10/1979 | Ueda et al. | 251/138 |

*Primary Examiner*—Gerald A. Michalsky
*Attorney, Agent, or Firm*—Sughrue, Rothwell, Mion, Zinn & Macpeak

[57] ABSTRACT

An electromagnetic control valve is provided with a housing having an inlet and two outlets extending through the wall of the housing. A valve member is mounted in spaced relation from each outlet opening on a resilient member for movement into and out of engagement with a valve seat surrounding the outlet opening. An elongated valve actuator is pivoted at its midpoint between the two valve members and is provided with a projection adjacent each end disposed in contact with a respective valve member. A spring normally biases the valve actuator about its pivot point to bias one of the valve members into engagement with its associated valve seat. An electromagnet is located on the opposite side of the valve actuator from said one of said valve members to pivot the valve actuator against the force of the spring.

3 Claims, 2 Drawing Figures

ELECTROMAGNETIC CONTROL VALVE ASSEMBLY

BACKGROUND OF THE INVENTION

1. Field Of The Invention

The present invention relates to an electromagnetic control valve assembly and, more particularly, to an electromagnetic control valve assembly having two valve members which are operable in response to a rotational movement of a single armature.

2. Prior Art

According to prior electromagnetic control valve constructions such as those disclosed in U.S. Pat. Nos. 3,319,733 and 3,405,779, the valve housing is provided with two ports adopted to be controlled by valve members mounted on opposite ends of a valve actuating lever which is pivoted for rotational movement at a point intermediate the ends thereof. The lever is normally spring biased for rotational movement in one direction and an electromagnet is provided for rotating the lever in the opposite direction. Therefore, the valve members which are rigidly secured to the ends of the levers follow arcuate paths as the lever is rotated about its pivot point and will not be moved into and out of engagement with their respective valve seats along straight line paths coaxial with the axes of the ports. As a result, a complete sealing engagement between the valve member and the valve seat cannot be assured and uneven wear will take place on the valve members and their respective valve seats.

SUMMARY OF THE INVENTION

The present invention is directed to a new and improved electromagnetic control valve assembly wherein a complete, even sealing engagement between the valve member and valve seat is achieved to prevent undue wear between the valve member and its respective seat.

The present invention is directed to an electromagnetic control valve assembly wherein the valve members are mounted in spaced relation from their respective valve seats surrounding the ports to be controlled in such a manner that the valve members will move into engagement with their respective valve seats along a straight line coaxial with the axis of the port. To achieve this straight line motion, the valve members utilize an elongated valve actuator which is pivotally mounted for rotation about a pivot axis intermediate the ends thereof. The valve members are mounted independently of the ends of the elongated valve actuator. The valve members are supported in the housing on resilient members which normally maintain the valve members in spaced relation from their respective valve seats. Spring means are provided to rotate the elongated valve actuator in one direction to bias one valve member into engagement with its seat, and electromagnetic means are provided to rotate the elongated valve actuator in the opposite direction to engage the other valve member with its seat.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
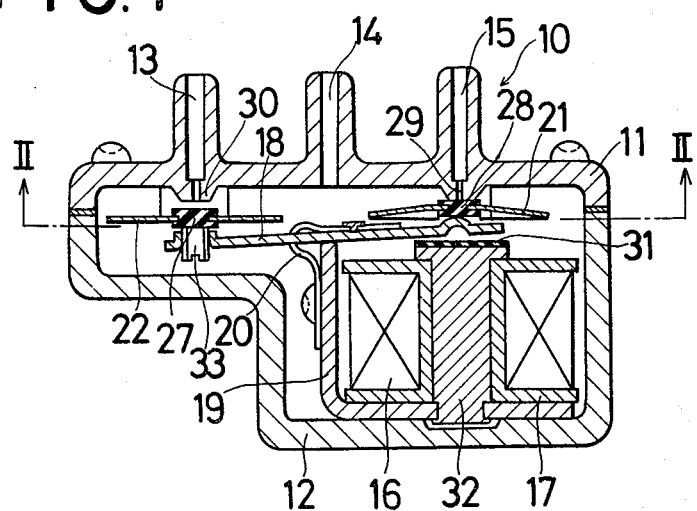
FIG. 1 is a sectional side elevation view of the electromagnetic control valve assembly according to the present invention.
Figure 2:
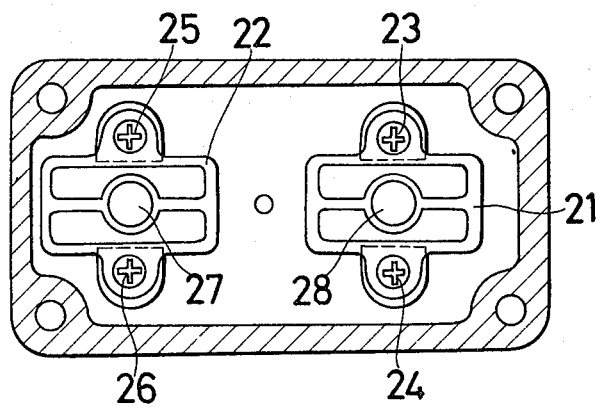
FIG. 2 is a sectional view taken along line II-II in FIG. 1.

Electromagnetic control valve assembly 10 is comprised of first and second bodies 11 and 12 which are secured to each other by any suitable means, such as machine screws or the like. The first body 11 has three ports 13, 14 and 15. Port 14 can be connected to a suitable control pressure which may be selectively distributed through outlet ports 13 or 15. However, according to a preferred embodiment of the present invention, port 13 is adapted to be connected to atmospheric pressure and port 15 is adapted to be connected to a vacuum source such as an intake manifold of a motor vehicle. Ports 13 and 15 are selectively on/off controlled by a valving operation which will be described hereinafter so that a signal pressure which will be modulated by means of the valving operation is transmitted to a fluid pressure controlled device (not shown) through outlet port 14.

A solenoid coil 16 is wound on bobbin 17 which is secured to a core 32. Coil 16 is adapted to be energized and de-energized in response to an electrical control signal from a computer which does not form part of the present invention and, therefore, is not shown. For example, coil 16 may be energized and de-energized in response to an electrical detecting signal from a conventional oxygen sensor which is positioned within the exhaust manifold of a motor vehicle. Core 32 is secured to body 12 by means of an angular yoke member 19.

An elongated valve actuator lever which acts as a movable armature for coil 16 is supported approximately at its mid-point on yoke member 19 by means of a spring 20 which is secured to yoke member 19 and to the armature or valve actuating lever. As a result of this connection, the valve actuating lever is pivotally mounted on yoke member 19 for rotational movement. Leaf spring 20 always biases the armature in a counter-clockwise direction so that when coil 16 is de-energized, the valve actuating lever will be disposed in the position shown in FIG. 1.

The pair of leaf springs 21 and 22 are secured to body 11 by means of screws 23, 24, 25 and 26 which engage laterally extending ears on the substantially rectangular leaf springs 21 and 22. Leaf springs 21 and 22 are provided with transverse arms which support resilient valve members 27 and 28 at the central portion thereof. Leaf springs 21 and 22 are sufficiently resilient so as to allow valve members 27 and 28 to be moved into engagement with valve seats 30 and 29, respectively, which surround ports 13 and 15. Normally, the leaf springs will maintain the valve members in a position spaced from their respective valve seats in the manner in which valve member 27 is positioned by leaf spring 22 in FIG. 1.

The valve actuating lever or armature 18 is provided with a convex portion 34 on one end which is adapted to engage valve member 28. As previously mentioned, valve actuating lever 18 is normally urged in the counterclockwise direction so that convex portion 34 will be normally in engagement with a valve member 28 to move valve member 28 into engagement with valve seat 29, thereby closing port 15.

An adjusting screw 33 is threaded into the other end of valve actuating lever 18 and is disposed in engagement with valve member 27. By rotating the adjusting screw, the clearance between valve member 27 and seat 30 may be adjusted.

Upon energization of coil 16, valve actuating lever 18 will be rotated in a clockwise direction against the biasing force of spring 20 so that valve member 27 will be brought into contact with valve seat 30 to close port 13 while valve member 28 is caused to be spaced from seat 29 due to the resiliency of leaf spring 21 upon which it is mounted. A resilient bumper 31 is secured to the end of core 32 so that when coil 16 is energized, the adjacent end of lever 18 will engage bumper 31 to prevent undue noise. Furthermore, the provision of bumper 31 effectively creates a gap between lever or armature 18 and core 32 when coil 16 is energized so that the magnetic hysteresis will be reduced and the response of the valving operation will be increased.

Coil 16 may be frequently energized and de-energized for varying lengths of time in response to an electrical control signal from the oxygen sensor. Thus, as lever 18 is operated, valve members 27 and 28 will alternately open and close ports 13 and 15, respectively, so that the output pressure which is transmitted to outlet port 14 will be modulated as desired. Outlet port 14 may be connected to a conventional air bleed control device (not shown) so that air is bled into the exhaust manifold in response to the modulated output pressure from electomagnetic control valve assembly 10.

Bumper 31 may be located on case 17 instead of core 32, and electromagnetic control valve assembly 10 may be constructed as a valve assembly which only provides on/off control for the ports. Other numerous modifications and variations of the present invention are obviously possible in light of the above teachings. It is, therefore, to be understood that within the scope of the appended claims, the invention may be practiced otherwise than as specifically described herein.

What is claimed is:

1. An electromagnetic control valve assembly comprising a hollow body having first and second ports extending therethrough, valve means associated with each of said first and second ports, each valve means comprising leaf spring means secured in said body adjacent to and spaced from a respective port and a valve member secured to said leaf spring means for movement into and out of engagement with a valve seat surrounding the respective port, said valve member being urged in one direction by the biasing force of said leaf spring means, an elongated valve actuator lever pivotably mounted in said body with the opposite ends thereof disposed in contact with said valve members, further spring means normally biasing said lever for rotation in a direction to move one of said valve members against the biasing force of said leaf spring means, and electromagnetic means operable to rotate said lever in the opposite direction to move the other valve member against the biasing force of said leaf spring means and said further spring means, said electromagnetic means being comprised of a solenoid coil assembly having a core disposed in alignment with one of said ports, one end of said lever being normally disposed in spaced relation to said core in engagement with a valve member so that on actuation of said solenoid coil assembly, said one end of said lever will engage said core and said valve member will be moved away from its respective valve seat by said resilient support means.

2. An electromagnetic control valve assembly as set forth in claim 1, wherein resilient bumper means are provided on the end of said core to cushion the impact of said one end of said lever.

3. An electromagnetic control valve assembly comprising a hollow body having first and second ports extending therethrough, valve means associated with each of said first and second ports, each valve means comprising leaf spring means secured in said body adjacent to and spaced from a respective port and a valve member secured to said leaf spring means for movement into and out of engagement with a valve seat surrounding the respective port, said valve member being urged in one direction by the biasing force of said leaf spring means, an elongated valve actuator lever pivotably mounted in said body with the opposite ends thereof disposed in contact with said valve members, further spring means normally biasing said lever for rotation in a direction to move one of said valve members against the biasing force of said leaf spring means, and electromagnetic means operable to rotate said lever in the opposite direction to move the other valve member against the biasing force of said leaf spring means and said further spring means, said leaf spring means always biasing said valve members in said one direction where said valve members are spaced from said valve seats, said further spring means biases said lever to thereby move said one of said valve members into engagement with its corresponding valve seat against said leaf spring means and said electromagnetic means is operable to rotate said lever to move the other valve member into engagement with its corresponding valve seat.

* * * * *